(12) United States Patent
Mittelstaedt et al.

(10) Patent No.: US 11,795,839 B2
(45) Date of Patent: Oct. 24, 2023

(54) STRUCTURAL ASSEMBLY FOR A GAS TURBINE ENGINE

(71) Applicant: Rolls-Royce Deutschland Ltd & Co KG, Blankenfelde-Mahlow (DE)

(72) Inventors: Stefan Mittelstaedt, Berlin (DE); Jiri Sacha, Berlin (DE)

(73) Assignee: ROLLS-ROYCE DEUTSCHLAND LTD & CO KG, Blankenfelde-Mahlow (DE)

(*) Notice: Subject to any disclaimer, the term of this patent is extended or adjusted under 35 U.S.C. 154(b) by 175 days.

(21) Appl. No.: 17/382,583

(22) Filed: Jul. 22, 2021

(65) Prior Publication Data

US 2022/0065166 A1   Mar. 3, 2022

(30) Foreign Application Priority Data

Aug. 25, 2020 (DE) .................. 10 2020 122 184.3

(51) Int. Cl.
*F01D 25/16* (2006.01)
*F02C 7/06* (2006.01)
*F01D 25/18* (2006.01)

(52) U.S. Cl.
CPC .......... *F01D 25/162* (2013.01); *F01D 25/18* (2013.01); *F02C 7/06* (2013.01); *F05D 2240/54* (2013.01); *F05D 2260/40311* (2013.01)

(58) Field of Classification Search
CPC .................... F01D 25/162; F05D 2240/14
See application file for complete search history.

(56) References Cited

U.S. PATENT DOCUMENTS

| 6,082,959 A | 7/2000 | Van Duyn |
| 8,182,153 B2* | 5/2012 | Singh .................... F16C 27/066 384/477 |
| 9,500,100 B2 | 11/2016 | Carter et al. |
| 9,695,870 B2* | 7/2017 | Amador .................. F16C 27/00 |
| 10,323,541 B2* | 6/2019 | Ganiger ................ F04D 29/321 |
| 10,690,004 B2 | 6/2020 | Leeder et al. |
| 2009/0034896 A1* | 2/2009 | Fisher .................... F16C 35/067 384/531 |
| 2018/0216631 A1* | 8/2018 | Thornton ................ F01D 9/041 |

FOREIGN PATENT DOCUMENTS

GB   2451731 A   2/2009

OTHER PUBLICATIONS

German Search Report dated Apr. 16, 2021 from counterpart German Patent Application No. 102020122184.3.

* cited by examiner

*Primary Examiner* — Justin D Seabe
(74) *Attorney, Agent, or Firm* — SHUTTLEWORTH & INGERSOLL, PLC; Timothy J. Klima

(57) ABSTRACT

The invention regards a structural assembly for a gas turbine engine which includes a bearing with a statically arranged outer ring and a rotatably arranged inner ring, the bearing outer ring including a radially outer surface. The assembly further includes a housing structure supporting the statically arranged outer ring. It is provided that the housing structure forms a housing ring against which the radially outer surface of the bearing outer ring lies and which supports the bearing outer ring radially outwards.

18 Claims, 4 Drawing Sheets

STRUCTURAL ASSEMBLY FOR A GAS TURBINE ENGINE

This application claims priority to German Patent Application DE102020122184.3 filed Aug. 25, 2020, the entirety of which is incorporated by reference herein.

The present disclosure relates to a structural assembly for a gas turbine engine.

It is known to provide a bearing in a structural assembly for a gas turbine in which a statically arranged outer ring of the bearing forms a flange which is connected to a housing flange of a support structure. The flanges are secured to each other by means of bolts. A radial load acting on the bearing is transferred through friction between the flanges to the support structure.

The problem underlying the present invention is to provide for a structural assembly for a gas turbine engine which enables a reliable load transfer from the bearing into a support structure.

This problem is solved by a structural assembly for a gas turbine engine and a gas turbine engine with features as disclosed herein. Embodiments of the invention are identified in the present disclosure.

According to an aspect of the invention, a structural assembly for a gas turbine engine is provided that comprises a bearing with a statically arranged outer ring and a rotatably arranged inner ring. The bearing outer ring comprises a radially outer surface. The structural assembly further comprises a housing structure supporting the statically arranged outer ring.

It is provided that the housing structure forms a housing ring against which the radially outer surface of the bearing outer ring lies and which supports the bearing outer ring radially outwards.

Aspects of the invention are thus based on the idea to direct the radial load directly into the housing structure by providing an outer ring of the housing structure against which the bearing outer ring lies. A form-fit in the radial direction is provided between the radially outer surface of the bearing outer ring and the outer ring of the housing structure, wherein radial loads are transferred into the housing structure. Such construction does not require flanges and bolts or the like to provide for a radial load transfer and, accordingly, has a simplified design and is easy to manufacture.

In addition, by the bearing outer ring directly contacting in the radial outward direction the outer ring of the housing structure, the radial load capacity is in principle unlimited. In particular, there is no risk of slippage between flanges under radial load which exists in prior art designs that implement flanges to connect the bearing outer ring and the housing structure.

The bearing outer ring may contact in the radial outward direction the housing ring of the housing structure with a clearance fit, a transition fit or an interference fit. Also, in an embodiment, a squeeze film damper may be implemented between the bearing outer ring and the housing ring of the housing structure, such squeeze film damper typically comprising a radial gap filled with oil.

Still further, a good load transfer can be achieved by the present invention without any substantial distortion of the bearing raceway which can be caused by an uneven deformation of flanges. A radial load is transferred in the radial direction evenly directly into the housing structure without the generation of bending loads. The deformation caused by the connection of the bearing outer ring to the housing structure is minimal.

According to an embodiment, the bearing outer ring is axially supported at one axial end by a structure of the housing ring. For example, it is supported at its axially forward end by such housing ring structure. Accordingly, the housing ring itself defines the structure which supports one of the ends of the bearing outer ring axially.

In an example, the structure in the housing ring that axially supports the one axial end of the bearing outer ring comprises a wall at one end of the housing ring, wherein the one axial end of the bearing outer ring lies against such wall. Such wall additionally serves to define an axial position of the bearing outer ring in the housing ring. It supports the bearing outer ring in an axial direction and, together with a further static component that axially supports the other axial end of the bearing outer ring, axially retains the bearing outer ring.

In another example, the structure in the housing ring that axially supports the one axial end of the bearing outer ring comprises a recess in the housing ring. Such recess additionally serves to define the axial position of the bearing outer ring in the housing ring. The axially forward or axially rearward end of the recess defines a wall against which the one axial end of the bearing outer ring rests and by which it is supported in the axial direction.

According to an embodiment, the bearing outer ring is axially supported at the axial other end by a further static component. For example, it is supported at its axially rearward end by such static component. For an efficient support, it may be provided that the further static component comprises a surface that extends in the radial direction, wherein the bearing outer ring is axially supported at its axial other end by such surface. Such surface may be flat. Further, such surface may comprises an anti-rotation feature.

There can be implemented an axial retention between the axial other end of the bearing outer ring and the further static component, e.g., between the axial other end of the bearing outer ring and said surface. Such radial retention may be provided by an interference fit between the axial other end of the bearing outer ring and the further static component, in particular between the axial other end of the bearing outer ring and said surface. By providing an interference fit, there is provided a reliable axial retention of the bearing outer ring.

In an embodiment, the further static component is a ring of an oil transfer unit. However, in principle any static component axially located next to the bearing outer ring may serve to provide for an axial support of the axial other end of the bearing outer ring.

In an embodiment, the further static component such as a ring of an oil transfer unit is coupled to the housing ring by means of bolts. However, such bolts are not connected to the bearing outer ring and only serve to provide an axial connection between the further static component and the housing structure, without absorbing any radial loads which are transferred directly between the bearing outer ring and the housing ring of the housing structure.

The bearing inner ring is connected to or a part of a rotating component. The static component is axially retaining the bearing outer ring and, if implemented by an oil transfer unit, is also delivering oil directly to the rotating component. As the rotating component is also located/positioned via the bearing, this solution is improving the positional tolerance between the further static component and the rotating component, and is also improving the bearing load capacity and reducing the number of fastening elements (bolts).

In an embodiment, the further static component comprises an axially extending part that extends axially forward to be arranged to the radial inside of the rotating component, wherein the axially extending part is separated from such rotating component in the radial direction by a gap.

In an embodiment, the bearing outer ring lies with its complete radially outer surface against the housing ring, namely, the radially inner surface of the housing ring. This avoids distortions and allows a symmetrical transfer of radial loads into the housing ring.

The housing structure may be a load-bearing structure of a gas turbine engine.

In an embodiment, the rotatably arranged inner ring of the bearing is connected to or an element of a carrier element of a planetary gearbox.

The bearing may be designed as a rolling-element bearing, wherein rolling elements are arranged between the inner ring and the outer ring.

In a further aspect of the invention a gas turbine engine for an aircraft is provided which comprises:
an engine core comprising a turbine, a compressor, and a core shaft connecting the turbine to the compressor;
a fan located upstream of the engine core, the fan comprising a plurality of fan blades; and
a planetary gearbox that receives an input from the core shaft and outputs drive to the fan so as to drive the fan at a lower rotational speed than the core shaft, wherein the planetary gearbox comprises a planet carrier which is supported by means of a bearing to a housing structure of the gas turbine engine.

In an embodiment, it is provided that
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

It should be noted that the present invention is described in terms of a cylindrical coordinate system having the coordinates x, r and φ. Here x indicates the axial direction, r the radial direction and φ the angle in the circumferential direction. The axial direction is defined by the machine axis of the gas turbine engine in which the present invention is implemented, with the axial direction pointing from the engine inlet to the engine outlet. Starting from the x-axis, the radial direction points radially outwards. Terms such as "in front of", "forward", "behind" and "rearward" refer to the axial direction or flow direction in the engine. Terms such as "outer" or "inner" refer to the radial direction.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and Utip is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 Nkg-1s, 105 Nkg-1s, 100 Nkg-1s, 95 Nkg-1s, 90 Nkg-1s, 85 Nkg-1s or 80 Nkg-1s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

The invention will be explained in more detail on the basis of exemplary embodiments with reference to the accompanying drawings in which.

Figure 4:
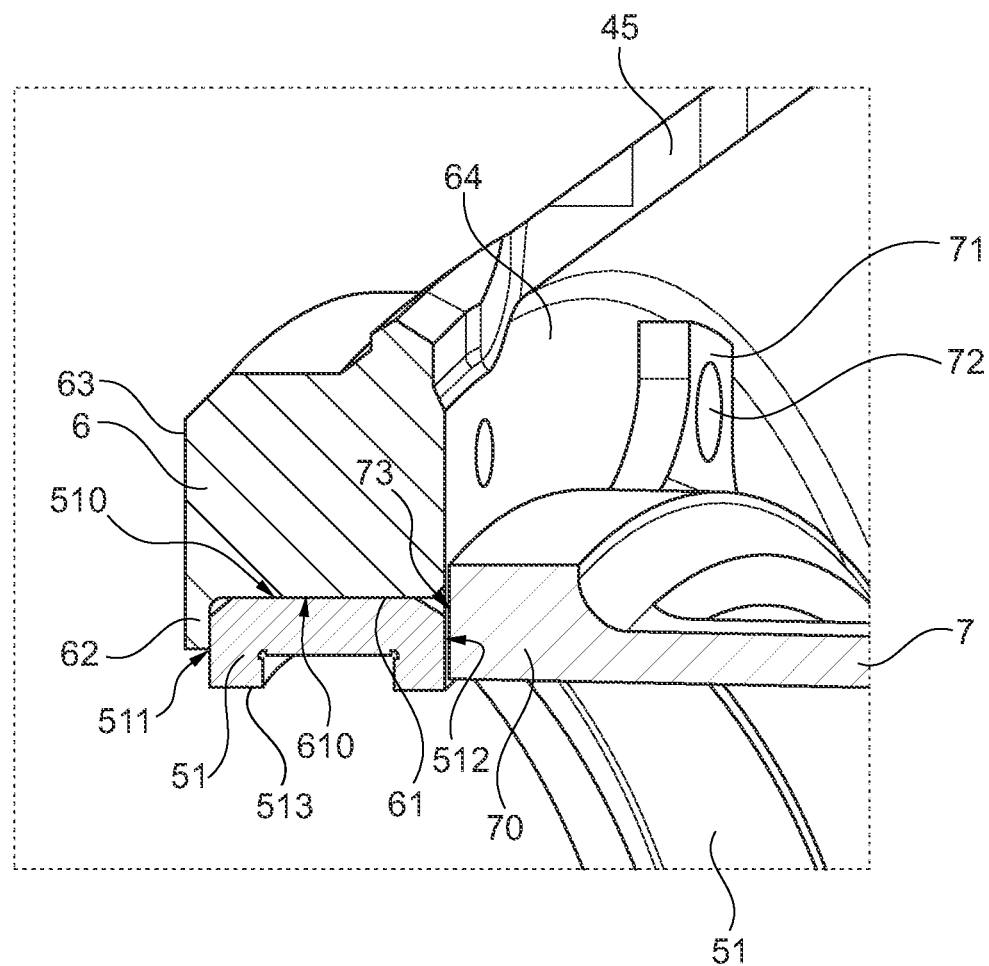
Figure 5:
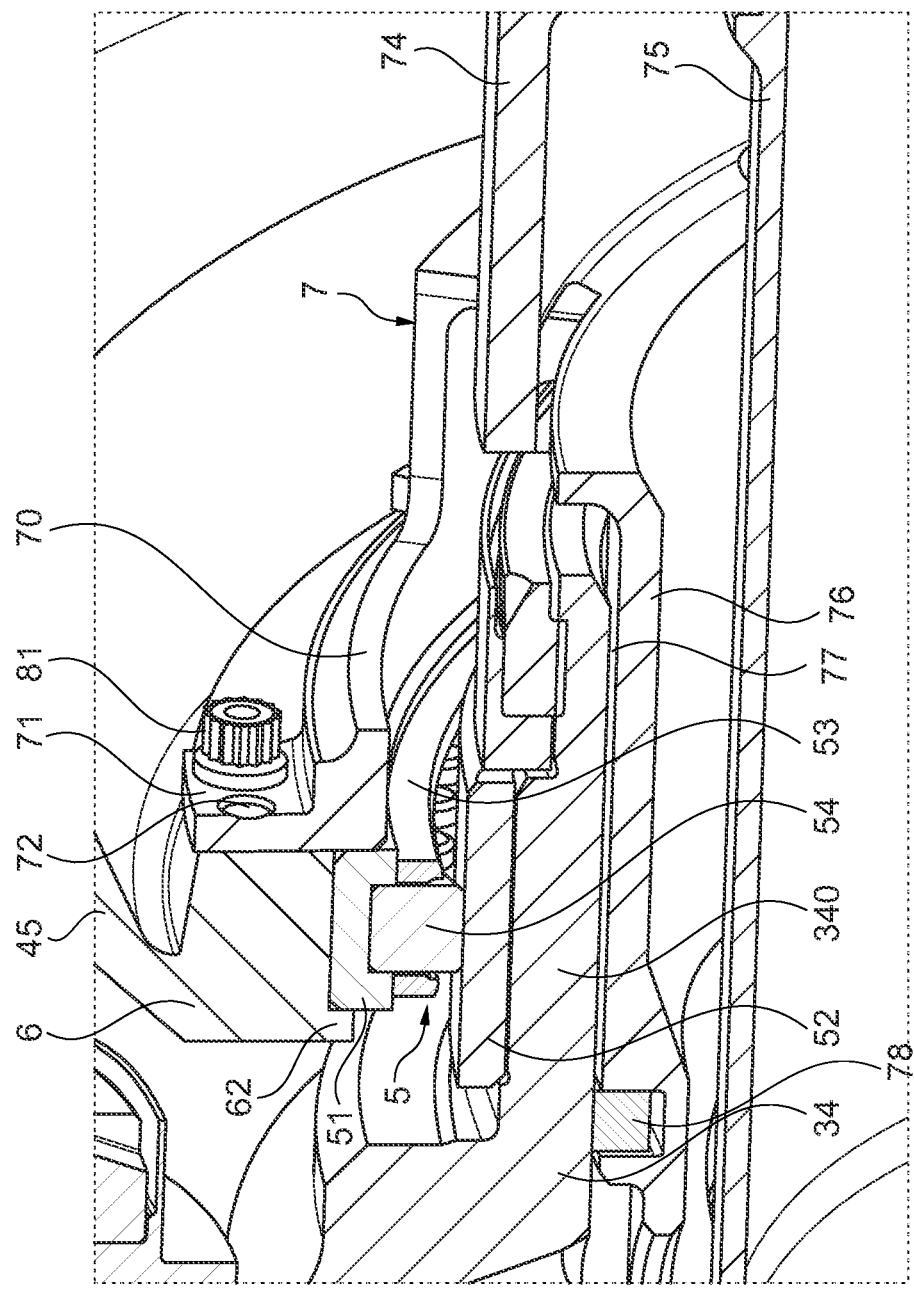

FIG. 4 is an embodiment of a structural assembly which comprises a bearing having a bearing outer ring and a bearing inner ring, wherein the bearing outer ring rests in the radially outward direction against a housing ring of a housing structure; and FIG. 5 the structural assembly of FIG. 4 together with further components of a planetary gearbox in a gas turbine engine, the further components comprising an oil transfer unit.

Figure 1:
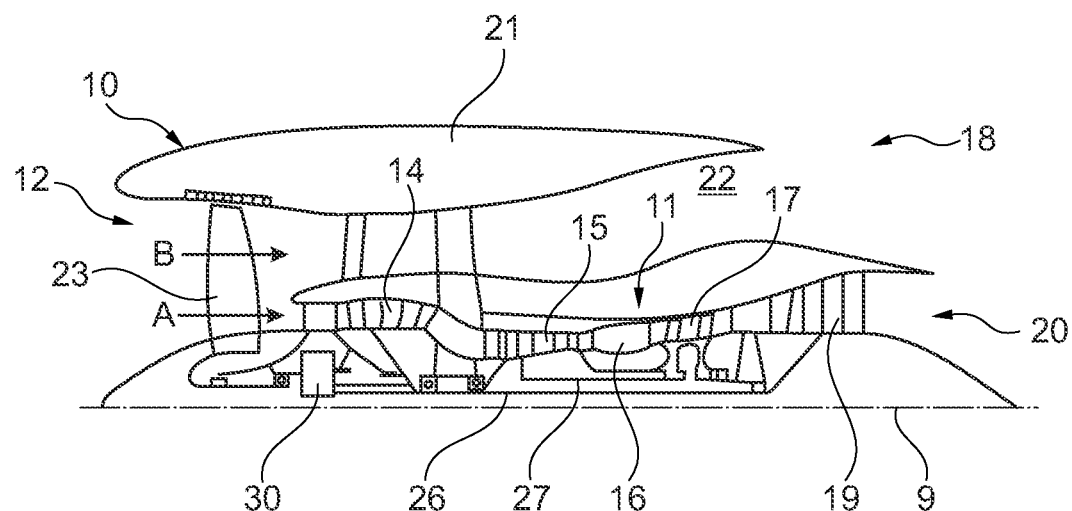
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclical gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclical gearbox 30 is a reduction gearbox.

Figure 2:
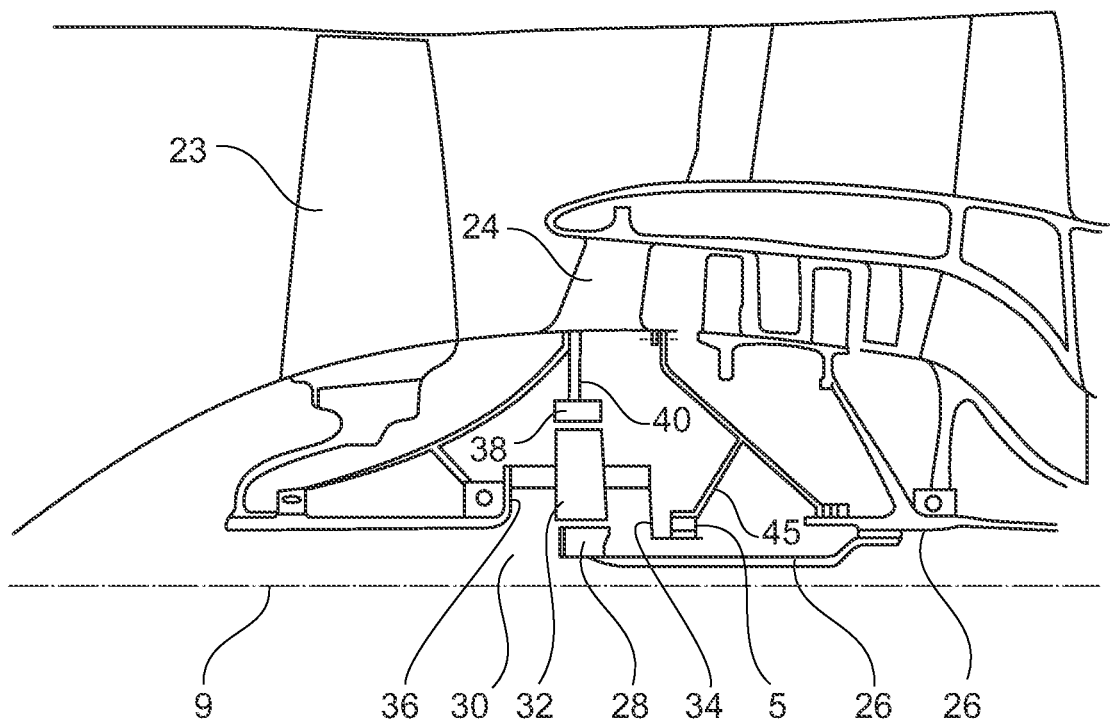
FIG. 2 is a close up sectional side view of an upstream portion of a gas turbine engine.

An exemplary arrangement for a geared fan gas turbine engine 10 is shown in FIG. 2. The low pressure turbine 19

(see FIG. 1) drives the shaft 26, which is coupled to a sun wheel, or sun gear, 28 of the epicyclical gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
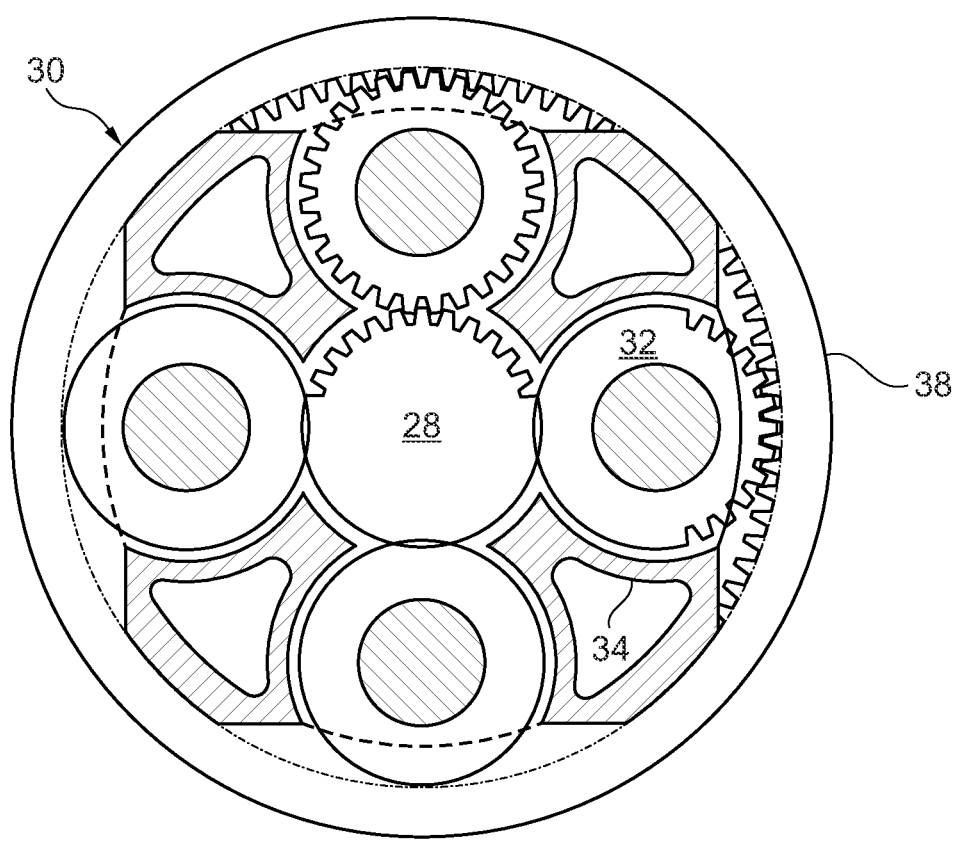
FIG. 3 is a partially cut-away view of a gearbox for a gas turbine engine.

The epicyclical gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclical gearbox 30 generally comprise at least three planet gears 32.

The epicyclical gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclical gearbox 30 may be used. By way of further example, the epicyclical gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

It is further pointed out that, in FIG. 1, the engine core 11 comprises a casing with an outer wall 110 which forms the radially inner boundary of the bypass duct 22. The radially outer boundary of the bypass duct 22 is formed by the inner wall 210 of the nacelle 21.

FIG. 2 shows that the planet carrier 34 is supported by a bearing 5. Bearing 5 has an outer ring that is supported by a strut 45 which is part of a housing structure or supporting structure of the gas turbine engine. In the context of the present invention, the design of the bearing 5 is of relevance. It should be noted, however, that the following description of the bearing 5 is not limited to its use as a support for a planet carrier in a gas turbine engine. Bearing 5 may be used in other contexts as well.

FIG. 4 depicts an embodiment of a bearing that comprises a bearing outer ring 51 which lies against a housing ring 6 that is formed by a housing structure 45. More particularly, the housing ring 6 forms a recess 61 at its radially inner side. By means of the recess 61, a radially inner surface 610 of the housing ring 6 is defined which extends in the axial direction.

The recess 61 does not extend all the way to the axially forward end 63 of the housing ring 6 such that an axially forward wall 62 is defined by the recess 61, wherein the wall 62 extends radially inward. On the other hand, the recess 61 does extend all the way to the axially rearward end 64 of the housing ring 6.

In recess 61 the bearing outer ring 51 is arranged. In particular, the bearing outer ring 51 comprises a radially outer surface 510 which lies against the radially inner surface 610 of the housing ring 6. The radially outer surface 510 of the bearing outer ring 51 also extends in the axial direction. Accordingly, a contact is provided between the bearing outer ring 51 and the housing ring 6 by the surfaces 510, 610 of the bearing outer ring 51 and the housing ring 6. The contact can be implemented with a clearance fit, a transition fit or an interference fit or by means of a squeeze film damper.

The bearing outer ring 51 further comprises an axially forward surface 511 defining a forward axial end of the bearing outer ring 51, an axially rearward surface 512 defining a rearward axial end of the bearing outer ring 51, and a radially inner surface 513. Both the axially forward surface 511 and the axially rearward surface 512 extend radially. The axially forward surface 511 partly rests in the axial direction against wall 62 of the housing ring, thereby defining a forward axial position of the bearing outer ring 51.

The axially rearward surface 512 of the bearing outer ring 51 rests in the axial direction against a surface 73 of a further statically arranged component which, in the depicted embodiment, is provided by a ring 70 of an oil transfer unit 7. The surface 73 is flat and extends radially in the depicted embodiment. However, the surface 73 can accommodate a geometrical anti-rotation features and/or some other features such as bulking features (i.e., features defining an orientation) or retention features. In particular, if the bearing outer ring 51 lies against the housing ring 6 with a transition fit, a clearance fit or with a squeeze film damper, a geometrical anti-rotation feature may be implemented to prevent rotation of the bearing outer ring 51. The axial dimension of the bearing outer ring 51 is such that there can be an interference fit between the axially rearward surface 512 of the bearing outer ring 51 and surface 73 of the oil transfer unit ring 70.

Accordingly, the bearing outer ring 51 is axially retained at its axially forward end 511 by wall 62 of the housing ring 6 and at its axially rearward end 512 by ring 70 of the oil transfer unit 7. Axial retention of the bearing outer ring 51 is provided without any need for flanges or the like coupled to the bearing outer ring 51.

The only flanges that are provided are flange-like projections 71 that extend radially outwards from ring 70 and which contain holes 72 to which bolts are to be inserted to connect and fix axially ring 70 of the oil transfer unit 7 and the housing ring 6 of housing structure 45. However, it is pointed out that such projections 71 and bolts do not lie within the radial load path from the bearing outer ring 51 to the housing ring 6 which goes directly through surfaces 510, 610. The projections 71 merely serve to connect the housing ring 6 and the oil transfer unit 7. Accordingly, relatively few projections 71 and bolts need to be provided only.

FIG. 5 shows further components of an example structural assembly for a gas turbine engine that comprises a bearing outer ring 51 and a housing ring 6 in accordance with FIG. 4. As additional components are shown a rotatably arranged inner ring 52 of the bearing 5, a cage 53 and rolling elements 54 of the bearing 5, a carrier element 34 of a planetary gearbox such as the planetary gearbox of FIGS. 1 to 3, and further parts of the oil transfer unit 7.

Ring 70 of the oil transfer unit 7 is coupled to the housing ring 6 by means of bolts 81 which are inserted into the holes 72 of the flange-like projections 71, wherein the bolts 81 are outside the radial load path of the bearing 5.

The bearing inner ring 52 is press fit onto a cylindrical part 340 of a carrier element 34 which is a rotating part of the planetary gearbox, as has been discussed with respect to FIGS. 1 to 3. The bearing 5 is a rolling-element bearing that comprises rolling elements 54 arranged in a cage 53 as is known to the person skilled in the art.

The non-rotating oil transfer unit 7 comprises in addition to non-rotating ring 70 a plurality of non-rotating parts 74, 75, 76 that serve to supply the planetary gearbox with oil as lubricant. To this end, oil pipes (not shown) are provided and oil is guided by the oil transfer unit 7 to the planetary gearbox.

More particularly, the oil transfer unit 7 is axially retaining the outer ring 51 and also delivering the oil directly to the rotating component 34. As the rotating cylindrical part 340 of carrier element 34 is also located and positioned via the bearing 5, this solution is improving the positional tolerance between the oil transfer unit 7 and the carrier element 34, and is also improving the bearing load capacity and reducing the number of bolts 81. The positional tolerance is improved as further parts that add to the tolerance between the position of the carrier element 34 and the position of the oil transfer unit 7 are avoided.

Further, the oil transfer unit 7 comprises an axially extending non-rotating part 76 that extends axially forward to be arranged to the radial inside the cylindrical part 340 of carrier element 34, wherein the axially extending part 76 is separated from such rotating component 340 in the radial direction by a gap 77. In addition, a sealing ring 78 may be provided between the carrier element 34 and the axially extending part 76.

In embodiments, the housing structure 45 including the housing ring 6 may be formed by titanium. The oil transfer unit 7 may be formed by steel. The inner ring 52 and the outer ring 51 of the bearing 5 may be formed by a special bearing steel. However, other materials and other material combinations may be used in other embodiments.

In operation, radial loads that act on the bearing 5 are transferred without distortion or tilting through the interface formed by the radially outer surface 510 of the bearing outer ring 51 and the radially inner surface 610 of the housing ring 6 directly into the housing ring 6, without any need for flanges and bolts. At the same time, a secure axial retention and fixation of the bearing outer ring 51 is provided by wall 62 of the housing ring 6 and by ring 70 of the oil supply unit 7.

It should be understood that the above description is intended for illustrative purposes only, and is not intended to limit the scope of the present disclosure in any way. Also, those skilled in the art will appreciate that other aspects of the disclosure can be obtained from a study of the drawings, the disclosure and the appended claims. All methods described herein can be performed in any suitable order unless otherwise indicated herein or otherwise clearly contradicted by context. Various features of the various embodiments disclosed herein can be combined in different combinations to create new embodiments within the scope of the present disclosure. In particular, the disclosure extends to and includes all combinations and sub-combinations of one or more features described herein. Any ranges given herein include any and all specific values within the range and any and all sub-ranges within the given range.

The invention claimed is:

1. A structural assembly for a gas turbine engine comprising:
 a bearing comprising a statically arranged bearing outer ring and a rotatably arranged bearing inner ring, the bearing outer ring comprising a radially outer surface,
 a housing structure supporting the bearing outer ring, wherein the housing structure forms a housing ring against which the radially outer surface of the bearing outer ring lies and which supports the bearing outer ring radially outward, wherein the bearing outer ring is axially supported at a second axial end by a further static component, wherein the bearing inner ring is connected to or a part of a rotating component, wherein the further static component comprises an axially extending part that extends axially forward to be arranged to a radial inside of the rotating component, wherein the axially extending part is separated from such rotating component in a radial direction by a gap.

2. The assembly of claim 1, wherein the bearing outer ring is axially supported at a first axial end by a structure of the housing ring.

3. The assembly of claim 2, wherein the structure of the housing ring that axially supports the first axial end comprises a wall at one end of the housing ring that extends radially inward, wherein the first axial end lies against such wall.

4. The assembly of claim 2, wherein the structure of the housing ring that axially supports the first axial end of the bearing outer ring comprises a recess in the housing ring.

5. The assembly of claim 1, wherein the further static component comprises a support surface that extends in a radial direction, wherein the bearing outer ring is axially supported at the second axial end by the support surface.

6. The assembly of claim 5, wherein the support surface of the further static component comprises a rotational fixing surface engaging the bearing outer ring in a rotationally fixed manner.

7. The assembly of claim 1, wherein the second axial end is retained axially by the further static component.

8. The assembly of claim 1, wherein the further static component is a ring of an oil transfer unit.

9. The assembly of claim 1, and further comprising bolts coupling the further static component is coupled to the housing ring, wherein the bolts are outside a radial load path of the bearing.

10. The assembly of claim 1, wherein the bearing outer ring contacts in a radially outward direction the housing ring with a clearance fit, a transition fit or an interference fit or by a squeeze film damper.

11. The assembly of claim 1, wherein the bearing outer ring lies with the radially outer surface engaging a radially inner surface of the housing ring.

12. The assembly of claim 1, wherein the housing structure is a load-bearing structure of a gas turbine engine.

13. The assembly of claim 1, wherein the bearing inner ring is connected to any portion of a carrier element of a planetary gearbox.

14. The assembly of claim 13, wherein the axially extending part is a part of the oil transfer unit, the axially extending part extending axially forward to be arranged to a radial inside of the carrier element, wherein the axially extending part is separated from the carrier element in a radial direction by a gap.

15. The assembly of claim 1, wherein the bearing is configured as a rolling-element bearing, wherein rolling elements are arranged between the bearing inner ring and the bearing outer ring.

16. A gas turbine engine for an aircraft comprising:
an engine core comprising a turbine, a compressor, and a core shaft connecting the turbine to the compressor;
a fan located upstream of the engine core, the fan comprising a plurality of fan blades; and
a planetary gearbox that receives an input from the core shaft and outputs drive to the fan so as to drive the fan at a lower rotational speed than the core shaft, wherein the planetary gearbox comprises a planet carrier which is supported by the assembly of claim 1, wherein the housing structure is connected to the gas turbine engine.

17. The gas turbine engine of claim 16, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

18. A structural assembly for a gas turbine engine comprising:
a bearing comprising a statically arranged bearing outer ring and a rotatably arranged bearing inner ring, the bearing outer ring comprising a radially outer surface,
a housing structure supporting the bearing outer ring,
wherein the housing structure forms a housing ring against which the radially outer surface of the bearing outer ring lies and which supports the bearing outer ring radially outwards,
wherein the bearing inner ring is connected to any portion of a carrier element of a planetary gearbox,
wherein the further static component comprises an axially extending part that extends axially forward to be arranged to a radial inside of the rotating component,
wherein the axially extending part is a part of the oil transfer unit, the axially extending part extending axially forward to be arranged to a radial inside of the carrier element, wherein the axially extending part is separated from the carrier element in a radial direction by a gap.

* * * * *